Nov. 29, 1955  R. J. CROSS  2,724,979
SHEET METAL SCREW
Filed Nov. 15, 1950
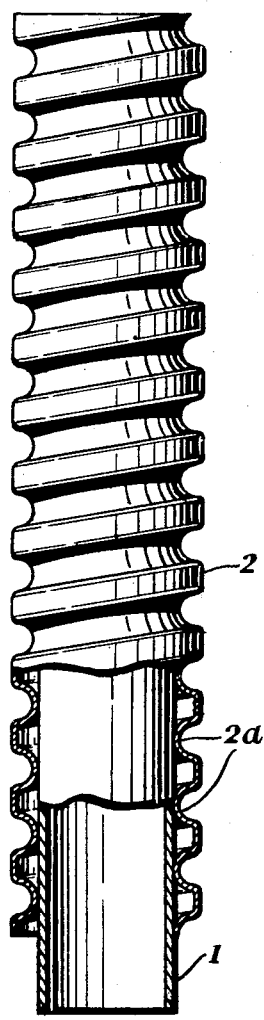
INVENTOR
Reginald J. Cross
By Watson, Cole, Grindle & Watson

United States Patent Office 2,724,979
Patented Nov. 29, 1955

2,724,979
SHEET METAL SCREW

Reginald Jack Cross, Homestead, Meopham, Kent, England, assignor of one-half to Essex Aero Limited, Gravesend, England Application November 15, 1950, Serial No. 195,746

Claims priority, application Great Britain November 16, 1949

3 Claims. (Cl. 74—459)

The invention relates to improvements in the manufacture of male screw-threaded members such as are required for use in situations where lightness of weight and cheapness of production are primary considerations.

According to the invention a method of fabricating a male screw-threaded rod-like element consists in swaging a thin walled tubular casing into a uniform helix constituting the screw thread, said casing being of a material capable of withstanding wear to which it may be subjected in cooperating with a nut screwed thereon, and securing the said casing to the outside of a tubular light weight metal core.

According to a further feature of the invention a male screw-threaded rod-like element comprises a light weight metal tubular core upon which is secured an outer thin walled tubular casing which has been swaged into a uniform helix constituting the screw thread, said casing being of a material more capable of withstanding wear, to which it may be subjected in cooperating with a nut screwed thereon, than the material of the core.

The tubular core may be of light weight metal, such as magnesium or aluminum or an alloy thereof. The swaged helical component however is made of steel, brass or other metal capable of withstanding wear to which it may be subjected in co-operating with a nut screwed thereon. The swaged helical component is preferably sweated on the tubular core over its whole length so that wherever the position of a co-operating nut on the length of the thread, the load is transmitted immediately to the tubular core. As an alternative to sweating the helical component on to the tubular core member, which involves first electro-plating the core member the swaged helical component may be heated and shrunk on to, or otherwise fixed to the tubular core.

In order that the invention may be more readily understood reference will be made to the accompanying drawing which illustrates by way of example a preferred embodiment thereof.

The drawing is an elevational view partly in section showing the swaged helical component and the tubular core in assembled relationship. In the embodiment illustrated the tubular core 1 is formed from a light metal alloy and the swaged helical component 2 is formed from carbon steel cold drawn seamless tube and the two parts are fixed together throughout their length by sweating. In this way the bottom 2a of every thread is firmly secured to the core so that any compressive or tensile loads applied to the threaded component are distributed in the tubular core.

A screw-threaded member manufactured in the manner described is especially suitable for use in the fabrication of the male threaded members of screw-jacks required for use in situations where weight must be minimized. For example, in many applications for which a screw-jack is used, the tubular core of the screw-threaded member may be made from a length of magnesium or aluminum alloy tube and the helical component may be made from a length of steel tube, the two tubes together are only a small fraction of the weight of a corresponding length of solid bar. The method is also advantageous for the reason that it can be performed with mechanical precision at a considerably less cost than would be entailed by the conventional process of machining the screw-threaded member from a solid bar. A screw manufactured by this method is found to possess a long working life and to co-operate smoothly with a suitably made nut.

What I claim as my invention and desire to secure by Letters Patent is:

1. A male screw-threaded rod-like element comprising a tubular core of relatively light-weight metal upon which is secured an outer thin-walled tubular casing of relatively strong, wear-resistant metal which has been swaged into a uniform helix constituting the screw thread, the said casing being secured to the core over its full length so that wherever the position of a co-operating nut on the length of the thread, the load is transmitted immediately to the tubular core.

2. An article as defined in claim 1, in which the core is formed of a material selected from the group consisting of alloys of magnesium and alloys of aluminum.

3. An article as defined in claim 2, in which the outer casing is formed of a material selected from the group consisting of steel and alloys of steel.

References Cited in the file of this patent
UNITED STATES PATENTS

| Number | Name | Date |
|---|---|---|
| 611,832 | Coughlan | Oct. 4, 1898 |
| 866,364 | Hutchins | Sept. 17, 1907 |
| 1,393,886 | Doty | Oct. 18, 1921 |
| 1,705,932 | Lewis et al. | Mar. 19, 1929 |
| 1,847,721 | Marles | Mar. 1, 1932 |
| 1,990,738 | La Porte | Feb. 12, 1935 |
| 2,137,044 | Dawson | Nov. 15, 1938 |